US008949371B1

(12) United States Patent
Shrowty

(10) Patent No.: US 8,949,371 B1
(45) Date of Patent: Feb. 3, 2015

(54) TIME AND SPACE EFFICIENT METHOD AND SYSTEM FOR DETECTING STRUCTURED DATA IN FREE TEXT

(75) Inventor: Vikram Shrowty, Fremont, CA (US)

(73) Assignee: Symantec Corporation, Mountain View, CA (US)

(*) Notice: Subject to any disclaimer, the term of this patent is extended or adjusted under 35 U.S.C. 154(b) by 79 days.

(21) Appl. No.: 13/249,108

(22) Filed: Sep. 29, 2011

(51) Int. Cl.
*G06F 15/16* (2006.01)
*G06F 17/00* (2006.01)

(52) U.S. Cl.
USPC .............................................. 709/217; 726/1

(58) Field of Classification Search
CPC ... H04L 29/08072; H04L 29/09; H04L 29/06; H04L 29/0809
USPC ......................................................... 709/217
See application file for complete search history.

(56) References Cited

U.S. PATENT DOCUMENTS

| 7,359,404 | B1 * | 4/2008 | Allan | 370/469 |
|---|---|---|---|---|
| 7,444,387 | B2 * | 10/2008 | Douceur et al. | 709/217 |
| 7,472,114 | B1 | 12/2008 | Rowney et al. | |
| 7,509,423 | B2 * | 3/2009 | Douceur et al. | 709/226 |
| 7,673,344 | B1 | 3/2010 | Rowney et al. | |
| 7,676,681 | B2 * | 3/2010 | Dillon et al. | 713/182 |
| 7,886,359 | B2 | 2/2011 | Jones et al. | |
| 7,933,208 | B2 * | 4/2011 | Bronnimann et al. | 370/241 |
| 7,945,637 | B2 * | 5/2011 | Van Vleet et al. | 709/217 |
| 7,996,385 | B2 | 8/2011 | Rowney et al. | |
| 8,010,085 | B2 * | 8/2011 | Apte et al. | 455/410 |
| 8,011,003 | B2 | 8/2011 | Rowney et al. | |
| 8,041,719 | B2 | 10/2011 | Rowney et al. | |
| 8,065,739 | B1 | 11/2011 | Bruening et al. | |
| 8,225,371 | B2 | 7/2012 | Jones et al. | |
| 8,312,101 | B2 * | 11/2012 | McCanne et al. | 709/216 |
| 8,312,553 | B2 | 11/2012 | Rowney et al. | |
| 8,321,528 | B2 * | 11/2012 | Sailhan et al. | 709/217 |
| 8,370,948 | B2 * | 2/2013 | Troyansky | 726/26 |
| 8,549,581 | B1 * | 10/2013 | Kailash et al. | 726/3 |
| 8,566,305 | B2 | 10/2013 | Rowney et al. | |
| 8,595,849 | B2 | 11/2013 | Jones et al. | |
| 8,661,498 | B2 | 2/2014 | Rowney | |
| 8,751,506 | B2 | 6/2014 | Rowney et al. | |
| 2005/0120004 | A1 * | 6/2005 | Stata et al. | 707/3 |
| 2006/0072582 | A1 * | 4/2006 | Bronnimann et al. | 370/395.32 |
| 2006/0271530 | A1 * | 11/2006 | Bauer | 707/5 |
| 2007/0015119 | A1 * | 1/2007 | Atenasio | 434/130 |
| 2007/0156842 | A1 * | 7/2007 | Vermeulen et al. | 709/217 |

(Continued)

OTHER PUBLICATIONS

Nielsen, Michael. (Sep. 26, 2012). Why Bloom filters work they way they do. 11 pp. Retrieved from http://www.michaelnielsen.org/ddi/why-bloom-filters-work-the-way-they-do/.*
Schnell, Rainer, et al. (2009). Privacy-preserving record linkage using Bloom filters. BMC Medical Informatics and Decision Making, 9(1), 41.*
Bloom, Burton (1970). Space/time trade-offs in hash coding with allowable errors. Communications of the ACM, 13(7), 422-426.*
Tarkoma, Sasu, et al. (2012). Theory and practice of Bloom filters for distributed systems. Communications Surveys & Tutorials, IEEE, 14(1), 131-155.*

(Continued)

*Primary Examiner* — Kristie Shingles
*Assistant Examiner* — Timothy Sowa
(74) *Attorney, Agent, or Firm* — Lowenstein Sandler LLP

(57) ABSTRACT

A server system identifies structured data for protection and creates an index of the structured data, the index comprising a set of Bloom filters. The server system distributes the index to an endpoint device to enable the endpoint device to monitor for structured data occurring in free text data associated with the endpoint device. The endpoint device may load, from the index file, a set of Bloom filters into memory and identify free text data for monitoring. The endpoint device may then determine whether the free text data contains at least a portion of the structured data using the set of Bloom filters.

20 Claims, 11 Drawing Sheets

(56) References Cited

U.S. PATENT DOCUMENTS

| | | | |
|---|---|---|---|
| 2007/0274324 A1* | 11/2007 | Wu et al. | 370/400 |
| 2008/0082628 A1* | 4/2008 | Rowstron et al. | 709/217 |
| 2009/0070459 A1* | 3/2009 | Cho et al. | 709/224 |
| 2009/0182726 A1* | 7/2009 | Wang | 707/5 |
| 2010/0199027 A1* | 8/2010 | Pucheral et al. | 711/103 |
| 2010/0287196 A1* | 11/2010 | Shields et al. | 707/769 |
| 2011/0078152 A1* | 3/2011 | Forman et al. | 707/747 |
| 2011/0138468 A1* | 6/2011 | Chaudhry et al. | 726/24 |
| 2011/0167474 A1* | 7/2011 | Sinha et al. | 726/1 |
| 2011/0225191 A1* | 9/2011 | Xie | 707/775 |
| 2011/0252033 A1* | 10/2011 | Narang et al. | 707/737 |
| 2012/0047223 A1* | 2/2012 | Tarkoma | 709/217 |
| 2012/0053927 A1* | 3/2012 | Kulkarni et al. | 704/9 |
| 2012/0240183 A1* | 9/2012 | Sinha | 726/1 |
| 2012/0287934 A1* | 11/2012 | Sarela et al. | 370/392 |
| 2012/0330909 A1* | 12/2012 | Bird et al. | 707/693 |

OTHER PUBLICATIONS

Bellovin, Steven, et al. (2007). Privacy-enhanced searches using encrypted bloom filters. Technical Report CUCS-034-07. Retrieved from http://academiccommons.columbia.edu/download/fedora_content/download/ac:110763/CONTENT/cucs-034-07.pdf.*

Singleton [Def. 2]. (n.d.). Webster's Third New International Dictionary, Unabridged. In Webster's Dictionary. Retrieved Aug. 22, 2013, from http://lionreference.chadwyck.com/searchFulltext.do?id=41668877&idType=offset&divLevel=2&queryId=../session/1377198511_26353&area=mwd&forward=refshelf&trail=refshelf.*

Thompson, D. (2009). Intro to Relational Databases: SQL Structured Query Language. Retrieved Aug. 22, 2013 from http://ccp.arl.arizona.edu/dthompso/sql_workshop/sql/select.html.*

* cited by examiner

TIME AND SPACE EFFICIENT METHOD AND SYSTEM FOR DETECTING STRUCTURED DATA IN FREE TEXT

TECHNICAL FIELD

The methods and systems described below relate to data loss prevention. More specifically, time and space efficient methods and systems for detecting structured data in free text are described.

BACKGROUND

Many organizations implement data loss prevention (DLP) systems to identify and control access to sensitive data. One type of data that is protected using DLP systems is structured data (e.g., data from a relational database). Current state-of-the-art methods used by DLP systems to protect structured data are accurate, but are very expensive in computational resources, and can therefore only be implemented on high end servers. Accordingly, endpoint devices either offload detection of structured data to a server or implement less accurate pattern matching techniques to detect structured data.

SUMMARY

In one embodiment, a server computer system identifies structured data for protection. The server computer system creates an index of the structured data, the index comprising a set of Bloom filters. In one embodiment, creating the index further comprises adding a set of token data values to a token list and passing each token data value in the token list to a first Bloom filter in the set. In one embodiment, the server computer system sorts the token data values in the token list, appends each token data value in the list to form a concatenated token, and passes the concatenated token to a second Bloom filter in the set. The server computer system distributes the index to an endpoint device to monitor for structured data occurring in free text data associated with the endpoint device. In one embodiment, the server computer system periodically distributes an updated index file over a secure network.

In one embodiment, the server computer system generates a list of token type patterns. In one embodiment, the server computer system generates a Social Security number token type pattern and generates a credit card number token type pattern. In one embodiment, the server computer system serializes the first Bloom filter, the second Bloom filter and the list of token type patterns into an index file.

In one embodiment, a computer readable medium includes instructions that will cause a processor that executes the instructions to identify structured data for protection. The instructions further cause the processor to create an index of the structured data, the index comprising a set of Bloom filters. The instructions further cause the processor to distribute the index to an endpoint device to monitor for structured data occurring in free text data associated with the endpoint device.

In one embodiment, a method comprises identifying structured data for protection, creating an index of the structured data, the index comprising a set of Bloom filters, and distributing the index to an endpoint device to monitor for structured data occurring in free text data associated with the endpoint device

BRIEF DESCRIPTION OF THE DRAWINGS

The system and methods are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
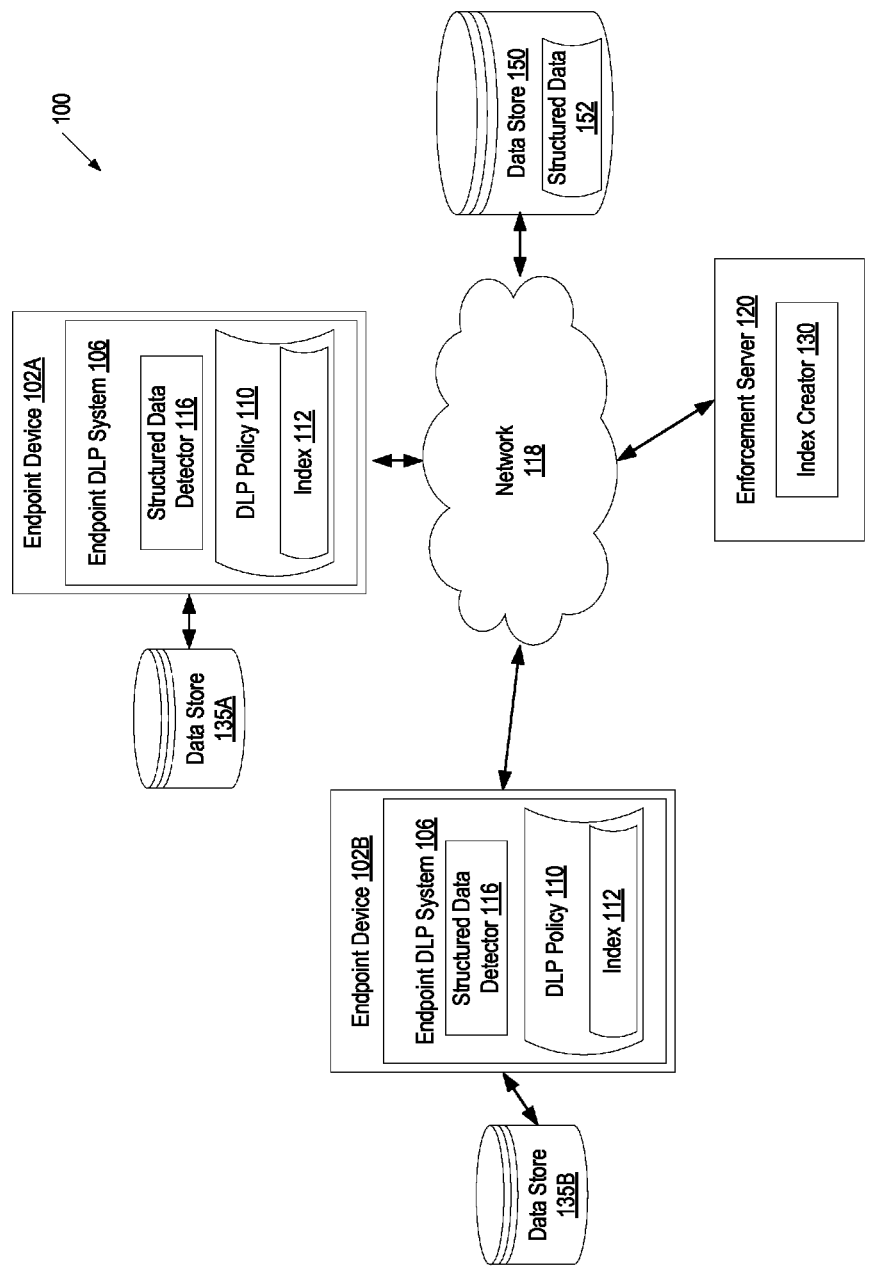
FIG. 1 illustrates an exemplary network architecture, in accordance with one embodiment of the present invention.

A system and method for protecting structured data in a time and space efficient manner are described. In embodiments of the present invention, the system and method generate an index including a set of Bloom filters populated with records from structured data. In further embodiments, the system and method compare portions of free text data (also known as unstructured data) to the Bloom filters to determine whether the free text data contains records from the structured data. The index containing the Bloom filters achieves an order of magnitude reduction in storage utilization over previous high accuracy techniques for protecting structured data. This enables the index to be used for protecting structured data on computing devices that are resource constrained, such as endpoint devices.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention. For example, the following description provides details for an index in an endpoint DLP system. However, it would be clear to one of ordinary skill in the art that embodiments of the present invention also apply to network DLP systems and to discover DLP systems (DLP systems that scan storage devices to identify and/or classify sensitive data). For example, in embodiments of the present invention, the index may be used for detecting sensitive data that moves through an enterprise network.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "creating", "distributing", "adding", "passing," "sorting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 illustrates an exemplary network architecture 100, in accordance with one embodiment of the present invention. The network architecture 100 includes multiple endpoint devices 102A-102B connected to an enforcement server 120 via a network 118. The network 118 may be a private network (e.g., a local area network (LAN), wide area network (WAN), intranet, etc.), a public network (e.g., the Internet), or a combination thereof.

Enforcement sever 120 manages data loss prevention (DLP) policies. Enforcement server 120 may be a single server computing device, or may include a cluster of multiple server computing devices. A DLP policy is a data structure containing a rule or set of rules that govern the detection of sensitive data. Endpoint devices 102A-102B include endpoint DLP systems 106 that implement the DLP policies to determine whether scanned data is sensitive data (includes sensitive information). The DLP policy may specify a type of content to be monitored (e.g., messages, displayed data, stored documents, etc.), how to identify sensitive data, and/or an action to be performed when sensitive data is detected.

Managing DLP policies may include generating and modifying DLP policies (e.g., based on administrator input). The enforcement server 120 may then propagate the DLP policies to the endpoint devices 102A-102B. Additionally, the enforcement server 120 may generate DLP response rules, which it may also propagate to the endpoint devices 102A-102B (either as components of a DLP policy or separately). The DLP response rules designate actions for endpoint devices 102A-102B to take when DLP policies are violated. Examples of actions that an endpoint device may take include sending a notification to an administrator, preventing the data from exiting the endpoint device 102A-102B through the data loss vector, locking down the endpoint device so that no data can be moved off of the endpoint device through any data loss vector, encrypting data as it is moved off the endpoint device, and so on.

Enforcement server 120 includes an index creator 130. Index creator 130 receives an identification of structured data to protect. As used herein, structured data is data organized in a structure. Examples of structured data include data stored on or extracted from a database, data from a spreadsheet, comma delimited flat files, and other data having a tabular structure (e.g., arranged based on a methodology of columns and rows). In one embodiment, the data to protect is structured data 152 from data store 150, which may be a network data store or a local data store coupled to enforcement server 120. In one embodiment, the data store 150 is a database (e.g., a relational database). The index creator 130 generates a set of Bloom filters from the identified structured data 152, and serializes the set of Bloom filters into an index 112 (also referred to as an index file). The index creator 130 may also generate a pattern list of token type patterns and serialize the pattern list into the index 112 along with the Bloom filters. The enforcement server 120 may then distribute the index 112 to the endpoint devices 102A-102B. In one embodiment, index creator 130 adds the index 112 to a DLP policy 110, and distributes the DLP policy 110 to the endpoint devices 102A-102B. The enforcement server 120 may also add DLP response rules to the DLP policy 110. The index creator 130 is described in greater detail below with reference to FIG. 2.

Referring back to FIG. 1, each of the endpoint devices 102A-102B may be a personal computer (PC), a laptop, a mobile phone, a tablet computer, or any other computing device. Each endpoint device 102A-102B has multiple different data loss vectors. Each data loss vector is a path through which data can be transferred off of the endpoint device. Examples of data loss vectors include burning files to an optical disc, copying data to a portable drive (e.g., a portable universal serial bus (USB) drive), printing data to a printer, sending data through a fax, sending an email, sending an instant message, performing a print screen operation, etc.

The endpoint devices 102A-102B each run an operating system (OS) (not shown) that manages hardware and software of the endpoint devices. The OS may be, for example, Microsoft® Windows®, Linux®, Symbian®, Apple's® OS X®, Solaris®, etc. One or more applications (not shown) run on top of the OS and perform various operations that involve accessing, moving, or otherwise manipulating data residing in a data store 135A-135B included in, attached directly to, or networked with the endpoint device 102A-102B. For example, the applications may include a CD or DVD burning application, an email application, a web browser, an instant messaging application, a printing application, a print screen function, etc. In one embodiment, the applications perform the operations in response to receiving user instructions.

Data stores 135A-135B may be hard disk drives, tape backups, optical drives, volatile memory (e.g., random access memory (RAM)), or other storage devices. Data stores 135A-135B may be internal to endpoint devices 102A-102B or external to endpoint devices 102A-102B. Data stores 135A-135B may contain data that includes protected structured data. The data may include files (e.g., documents), messages, tables, or other data formats. Examples of sensitive information that may be stored in structured data include source code, patient health information, insurance claims, product formulas, legal documents, sales and marketing reports, Social Security numbers, credit card numbers, etc.

Each endpoint device 102A-102B includes an endpoint DLP system 106 that monitors data loss vectors to ensure that protected structured data (e.g., that contains sensitive or confidential information) does not leave the endpoint device for illegitimate purposes. The endpoint DLP system 106 may scan data such as free text data (e.g., unstructured data) as it moves through a data loss vector and/or when a request to send the data through a data loss vector is received. When the endpoint DLP system 106 detects data moving through a data loss vector or a request to move the data through the data loss vector, the endpoint DLP system 106 implements DLP policy 110 to determine whether the data contains protected structured data. In one embodiment, the DLP policy 110 includes an index 112 that has a set of Bloom filters. The DLP agent 106 includes a structured data detector 116 that processes the data using the Bloom filters contained within the index 112. By processing the data using the Bloom filters contained within the index 112, the structured data detector 116 determines whether the data (e.g., free text data) contains sensitive structured data. The endpoint DLP system 106 is described in greater detail with reference to FIG. 4.

Figure 2:
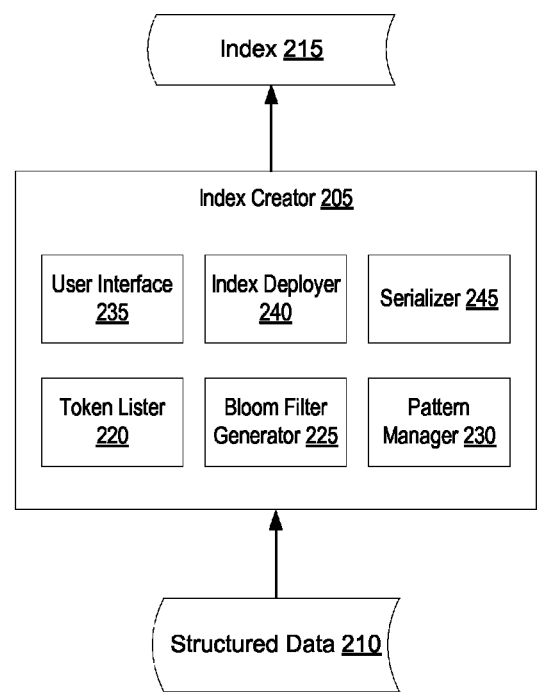
FIG. 2 is a block diagram of an index creator, in accordance with one embodiment of the present invention.

FIG. 2 is a block diagram of an index creator 205, in accordance with one embodiment of the present invention. In one embodiment, the index creator 205 includes a token lister 220, a Bloom filter generator 225, a pattern manager 230, a serializer 245, an index deployer 240 and a user interface 235. Note that in alternative embodiments, one or more of the token lister 220, Bloom filter generator 225, pattern manager 230, serializer 245, index deployer 240 and/or user interface 235 may be combined into a single module or divided into multiple modules.

Figure 3:
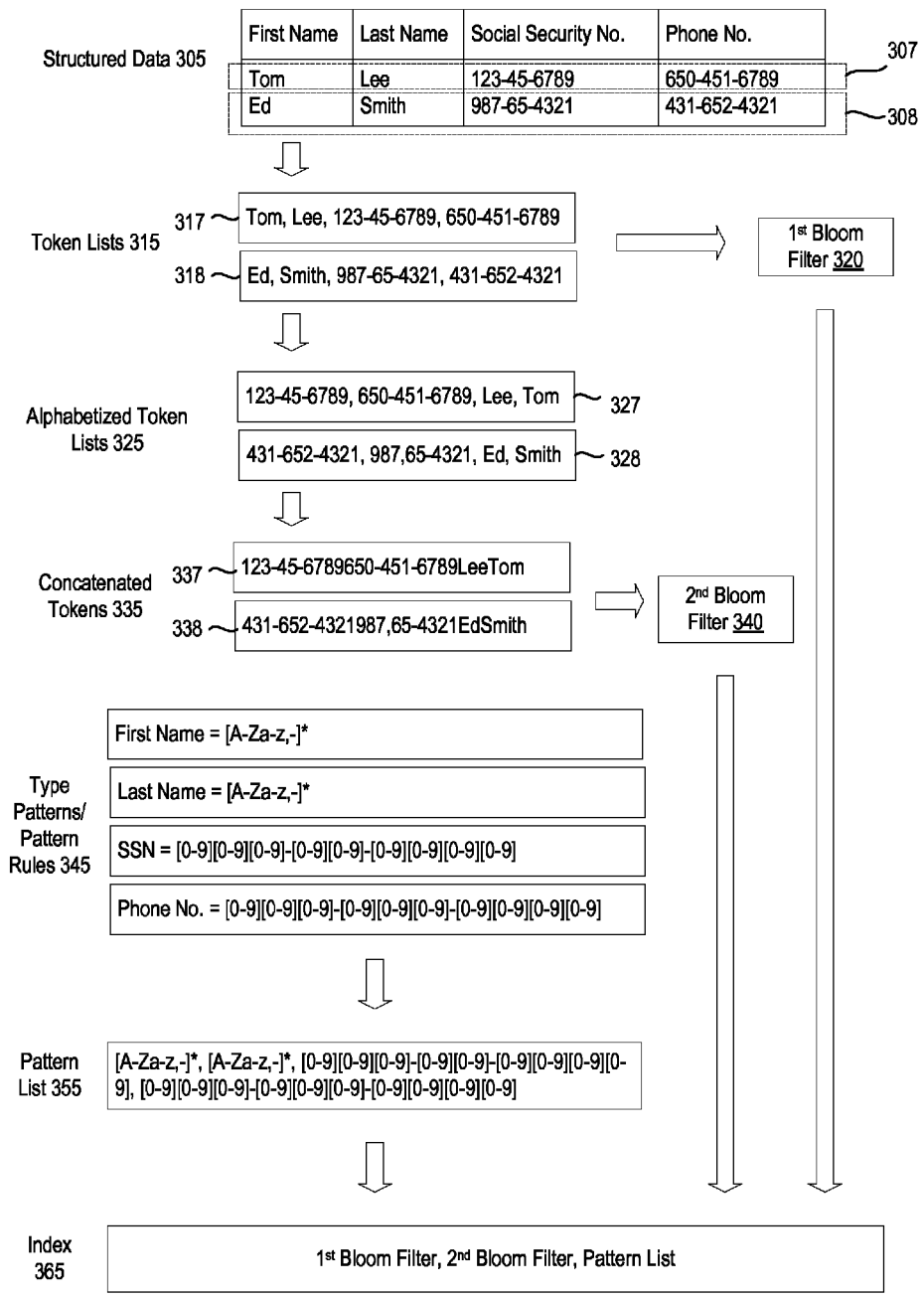
FIG. 3 is a diagram showing generation of an index from structured data, in accordance with one embodiment of the present invention.

Index creator 205 receives as an input a set of structured data 210. The structured data 210 may be database data (e.g., from a relational database), spreadsheets, tables, or other data having a tabular structure. In one embodiment, a user selects the structured data to be protected via the user interface 235. Using a database as an example, the user may select to protect the entire database, specific records (e.g., rows) from the database, specific attributes (e.g., columns) of the database and/or specific attributes of specified records. Similarly, with spreadsheets, tables, flat files, etc., the user may select to protect the entire contents or only portions of data. FIG. 3 illustrates example structured data 305 that includes a first record 307 and a second record 308, in accordance with one example embodiment of the present invention. Each record of the structured data 305 in the example includes a first name, last name, Social Security number and phone number.

Returning to FIG. 2, token listener 220 generates token lists for records in the provided structured data 210. A token list may be a data structure that delimits each individual token of a record. Token lister 220 may generate multiple token lists from a single record. For example, token lister 220 may generate a first token list that includes all tokens of a record and a second token list that includes only a portion of the tokens. Referring back to FIG. 3, example token lists 315 include a first token list 317 generated from the first record 307 and a second token list 318 generated from the second record 308, in accordance with one example embodiment.

Returning again to FIG. 2, Bloom filter generator 225 generates a first Bloom filter and adds tokens from the token lists to the first Bloom filter. A Bloom filter is a space-efficient randomized data structure for representing a set in order to support membership queries. A Bloom filter represents a set $A=\{a_1, a_2, \ldots, a_n\}$ of n elements (called keys). The Bloom filter for representing the set A is described by an array of m bits, initially all set to 0. The Bloom filter uses k independent hash functions $h_1, \ldots, h_k$ with range $\{1, \ldots, m\}$. For each element, the bits at positions $h_1(a), h_2(a), \ldots, h_k(a)$ in a vector of m bits are set to 1. Given a query for b, the bits are checked at positions $h_1(b), h_2(b), \ldots, h_k(b)$. If any of them is set to 0, then it is guaranteed that b is not in the set A. Otherwise it can be conjectured that b is in the set.

Depending on the size of the Bloom filter and the number of entries, there is a certain chance for a false positive (a determination that b is in the set when it is not). The parameters of k and m should be chosen such that the probability of a false positive is acceptable. In Bloom filters there is a tradeoff between m and the probability of a false positive. The probability of a false positive can be approximated to:

$$P=(1-e^{kn/m})^k$$

For example, a Bloom filter having 100 bits (m=100), 5 hash functions (k=5) and 10 recorded entries (n=10) has a false positive probability of approximately 0.005. In embodiments of the present invention, Bloom filters can be used that have an accuracy of up to 99.999% at approximately a tenth of the size of a standard hash table. Bloom filters with other accuracies may also be used. Probabilistic data structures (e.g., Bloom filters) offer significant advantages over standard data structures such as hash tables. Probabilistic data structures are faster to read from, faster to write to, and require less storage capacity than standard data structures. However, probabilistic data structures are not 100% accurate. For example, Bloom filters have a chance of false positives (as described above).

In alternative embodiments, Bloom filter generator 225 may generate and utilize other types of probabilistic data structures (other than Bloom filters), such as a probabilistic hash table (e.g., a hash table using cuckoo hashing or bitstate hashing and hash compaction). FIG. 3 shows an example first Bloom filter 320 that has been generated based on tokens from a first token list 317 and second token list 318, in accordance with one example embodiment.

Returning to FIG. 2, token lister 220 orders the tokens in the token lists according to some ordering rule or rules. In one embodiment, token lister 220 orders the tokens in the token lists alphabetically and in ascending numerical order. However, other ordering schemes may be used. FIG. 3 shows alphabetized token lists 325, which include alphabetized token list 327 and alphabetized token list 328, corresponding to token lists 317 and 318, respectively, in accordance with one example embodiment.

Returning to FIG. 2, for each token list, token lister 220 concatenates the tokens from the token list into a single concatenated token. FIG. 3 shows concatenated tokens 335, including concatenated token 337 and concatenated token 338, generated from alphabetized token lists 327 and 328, respectively, in accordance with one example embodiment.

Returning again to FIG. 2, Bloom filter generator 225 generates a second Bloom filter (or other probalistic data structure) using the concatenated tokens. FIG. 3 shows a second Bloom filter 340 that has been generated from concatenated token 337 and concatenated token 338, in accordance with one example embodiment.

Again returning to FIG. 2, in one embodiment, pattern manager 230 determines type patterns for each attribute in the structured data. Preferably, pattern manager 230 determines a strictest possible pattern rule or rules for each attribute. The pattern rule or rules define the type pattern of an attribute. In one embodiment, pattern manager 230 determines the type patterns by analyzing the values of the attributes from each record of the structured data to determine the pattern rules. Alternatively, or in addition, a user may specify one or more pattern rules via the user interface 235. Examples of type patterns include type patterns for a Social Security number attribute, for a credit card number attribute, for a name attribute, for a phone number attribute, and so on.

Referring again to FIG. 3, structured data 305 includes a first name attribute, a last name attribute, a Social Security number attribute and a phone number attribute, in accordance with one example embodiment. Pattern rules 345 have been determined for each of these attributes. In one embodiment, the pattern rules are string matching pattern is a pattern rule that define a particular type pattern. Pattern rules for the first name attribute and last name attribute have been determined to be [A-Za-z,-]*, meaning that a token containing any combination of upper case and lower case letters and/or hyphens will be categorized as both a first name and a last name. A pattern rule for the Social Security number attribute has been determined to be [0-9][0-9][0-9]-[0-9][0-9]-[0-9][0-9][0-9][0-9]. Accordingly, any combination of three numbers, a hyphen, two more numbers, another hyphen, and four more numbers arranged in sequence will be classified as a Social Security number. A pattern rule for the phone number attribute has been determined to be [0-9] [0-9] [0-9]-[0-9] [0-9][0-9]-[0-9][0-9][0-9][0-9].

Returning again to FIG. 2, once pattern manager 230 has generated the string matching patterns, it generates a pattern list that includes the type patterns. In one embodiment, the type patterns are arranged in the same order as the attributes that they represent in the structured data. For example, in FIG. 3 a pattern list 355 includes a first pattern type for a first name, followed by a pattern type for a last name, followed by a pattern type for a Social Security number, followed by a pattern type for a phone number, in accordance with one example embodiment.

Returning again to FIG. 2, the first Bloom filter, second Bloom filter and pattern list may be in memory data structures. In one embodiment, serializer 245 serializes the first Bloom filter, second Bloom filter and/or pattern list into an index 215 (e.g., into an index file). Serialization is the process of converting a data structure or object state (e.g., for the Bloom filters) into a format that can be stored (for example, in a file or memory buffer) or transmitted across a network connection link. The series of bits (e.g., a file) that the objects have been serialized into can later be reread according to the serialization format to create a semantically identical clone of the original object. Accordingly, the index 215 can be distributed to DLP systems, and can be read into memory to recreate the first Bloom filter, second Bloom filter and/or pattern list.

Once an index 215 is ready for deployment (e.g., the index has been generated and serialized into a file), index deployer 240 deploys the index 215. In one embodiment, index deployer 240 adds the index to an existing DLP policy. Alternatively, the index deployer 240 may generate a new DLP policy and add the index 215 to the new DLP policy. FIG. 3 illustrates an index 365 that has been generated from pattern list 355, first Bloom filter 320 and second Bloom filter 340, in accordance with one example embodiment.

Figure 4:
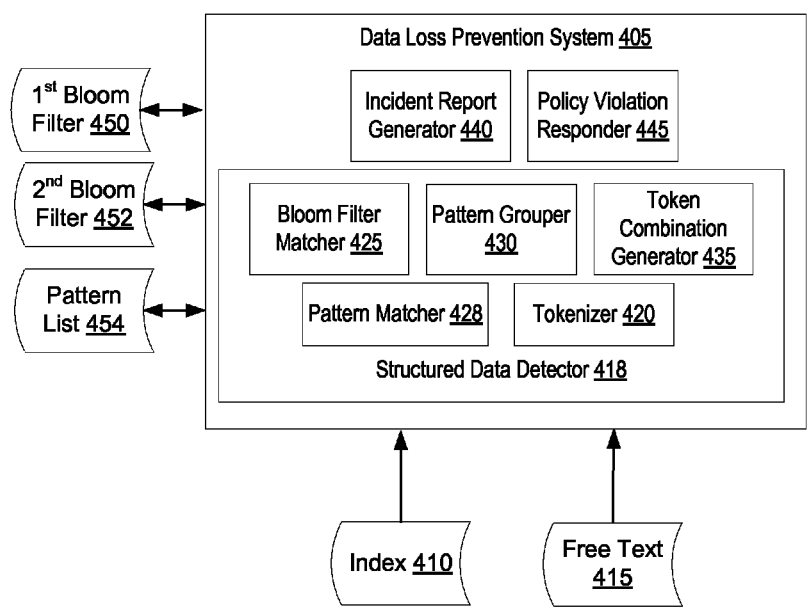
FIG. 4 is a block diagram of a data loss prevention system, in accordance with one embodiment of the present invention.

FIG. 4 is a block diagram of a data loss prevention system 405, in accordance with one embodiment of the present invention. In one embodiment, the DLP system 405 corresponds to endpoint DLP system 106 of FIG. 1. Alternatively, DLP system 405 may be a network DLP system that protects data flowing through a network or a discover DLP system. The DLP system 405 may monitor different data loss vectors, applications, data, etc. to detect operations that attempt to move data off of an endpoint device, off of a server, out of a private network, etc. The operations may include, for example, saving or accessing restricted database data on any storage device of a endpoint device, using restricted database data in an application, printing confidential data, using confidential data in a network communication protocol, etc. The DLP system may also scan data at rest to identify data containing protected structured data.

The DLP system 405 may include a structured data detector 418. Structured data detector 418 loads an index into memory. The index may include a serialized first Bloom filter 450, second Bloom filter 452 and pattern list 454. Structured data detector 418 reverses the serialization process to load the first Bloom filter 450, second Bloom filter 452 and pattern list 454 into memory from the index 410. In one embodiment, the index 410 is included in a DLP policy. The DLP policy may also include additional policy violation rules and/or rules for responding to policy violations.

DLP system 405 may detect an attempt to perform an operation on free text (e.g., unstructured data). For example, DLP system 405 may detect an outgoing email message, instant message, print command, screen print, command, and so forth. In response, structured data detector 418 scans the free text 415 to determine whether the free text 415 contains sensitive structured data.

Figure 5A:
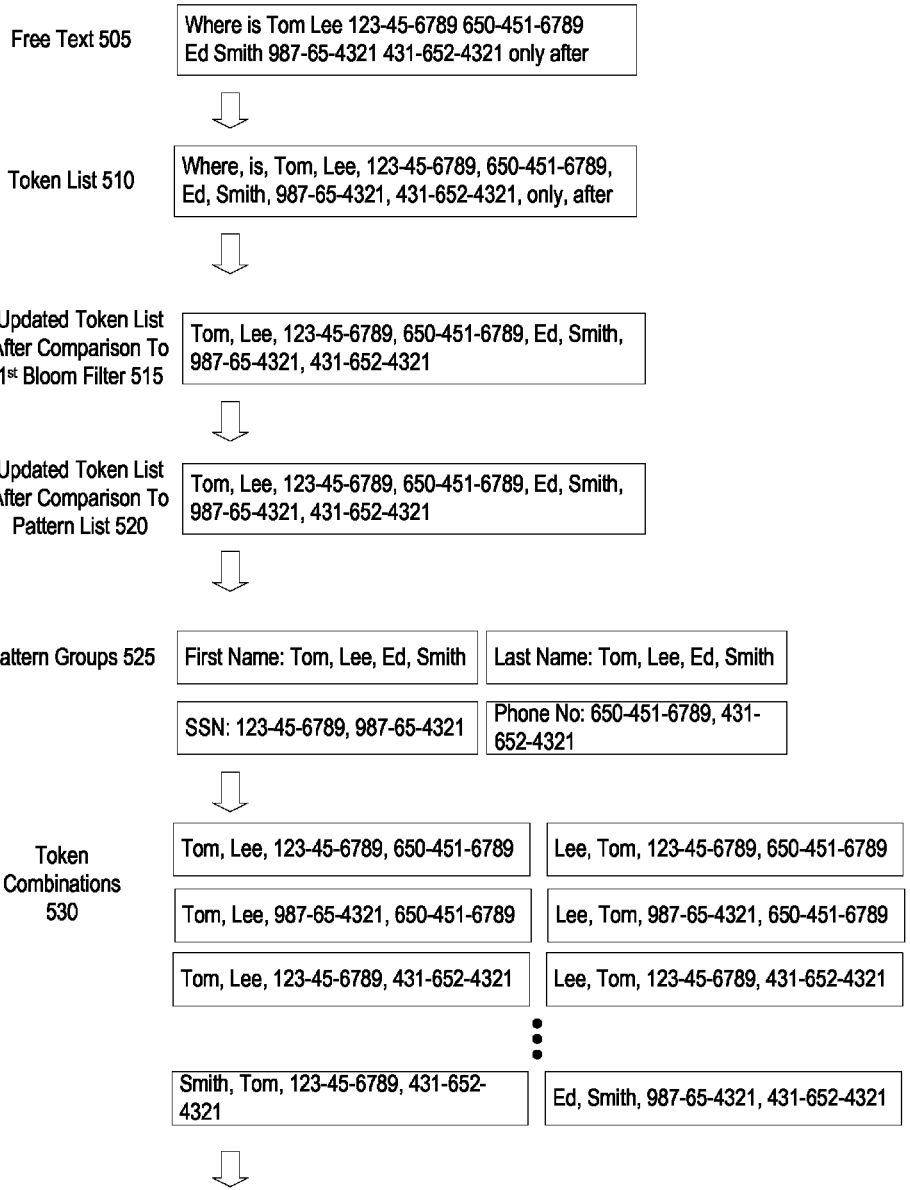
FIGS. 5A-5B are diagrams showing identification of protected structured data in free text, in accordance with one embodiment of the present invention.

In one embodiment, tokenizer 420 parses the free text 415 into a collection of tokens and generates a token list that includes the tokens from the free text 415. FIG. 5A illustrates input free text 505 and a token list 510 generated from the free text 505, in accordance with one example embodiment.

Returning to FIG. 4, Bloom filter matcher 425 queries the first Bloom filter 450 with each token from the token list. Querying the first Bloom filter 450 may include passing a token to the first Bloom filter. The first Bloom filter 450 processes the token it is passed and returns a positive answer (indicating that a queried token is included in a token set associated with the first Bloom filter 450), or a negative answer (indicating that the queried token is not included in the token set associated with the first Bloom filter 450). Those tokens for which a negative answer is returned from the first Bloom filter 450 are discarded from the token list.

As set forth above, a Bloom filter may return false positives (indicating that a queried token is a member of the Bloom filter when it actually is not a member), but never returns false negatives. Accordingly, in one embodiment pattern matcher 428 compares each token to the type patterns included in pattern list 454. Those tokens that fail to satisfy any of the pattern rules of the pattern types in the pattern list 454 are discarded from the token list. This can filter out at least a portion of false positives returned by the first Bloom filter 450.

FIG. 5A shows an updated token list after comparison to a first Bloom filter 515, in accordance with one example embodiment. FIG. 5A further shows an updated token list after comparison to a pattern list 520.

Returning again to FIG. 4, pattern grouper 430 generates a pattern group for each type pattern in the pattern list 454. For each pattern group, pattern grouper 430 adds tokens to that pattern group that match the pattern rules for the type pattern. This is illustrated in the example pattern groups 525 shown in FIG. 5A, in accordance with one example embodiment. As shown, tokens Tom, Lee, Ed and Smith are added as members of both the first name pattern group and the last name pattern group. Tokens 123-45-6789 and 987-65-4321 are added as members of the Social Security number pattern group, and tokens 650-451-6789 and 431-652-4321 are added as members of the phone number pattern group.

Returning again to FIG. 4, token combination generator 435 generates token lists for every possible combination of tokens from the different pattern groups. Each combination includes a token from a first pattern group, a different token from a second pattern group, a different token from a third pattern group, and so on. Token combination generator 435 sorts each token list using the same sorting rule or rules used by index creator 205 during index generation. In one embodiment, token combination generator 435 sorts the token lists alphabetically and in ascending numerical order. Token combination generator 435 then concatenates each token list into a concatenated token. Bloom filter matcher 425 queries second Bloom filter 452 for each concatenated token. Any concatenated tokens that are identified as members of the token set represented by second Bloom filter 452 (any positive responses to the queries) are identified as protected structured data. In one embodiment, the probability of false positives is the product of the probability of false positives in the first Bloom filter and the probability of false positives in the second Bloom filter. The probability of false positives can be reduced by increasing the size of one or both of the Bloom filters chosen at indexing. Accordingly, an administrator may adjust a desired accuracy based on increasing or decreasing an allocated resource utilization.

Figure 5B:
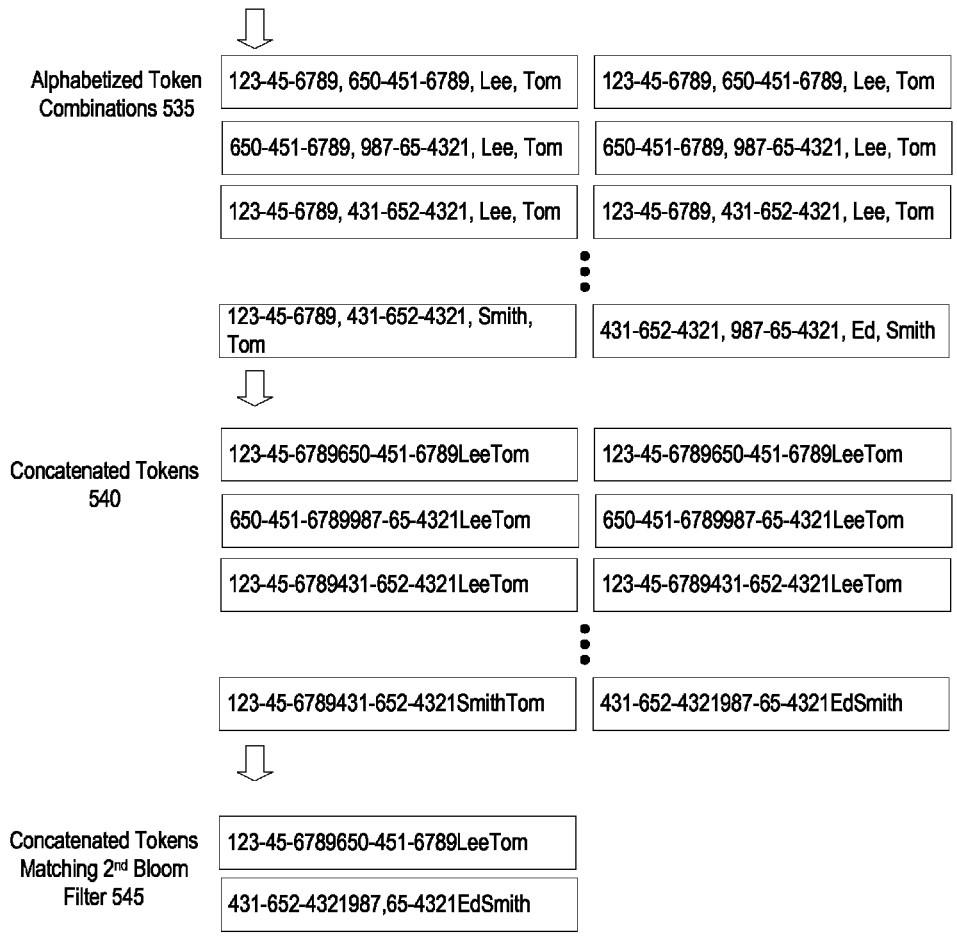

FIG. 5A shows possible token combinations 530 generated from the members of pattern groups 525, in accordance with one example embodiment. For example, the token combinations 530 include a first token list including the tokens tom, lee, 123-45-6789 and 650-451-6789, a second token list including the tokens lee, tom, 123-45-6789 and 650-451-6789, a third token list including the tokens tom, lee, 987-65-4321 and 650-451-6789, and so on. FIG. 5B shows alphabetized token combinations 535 generated from the token combinations 530, in accordance with one example embodiment. Concatenated tokens 540 generated from the alphabetized token combinations 535 are also shown. Finally, concatenated tokens that were found to match entries in a second Bloom filter 545 are shown. Comparing concatenated tokens 545 to concatenated tokens 335 of FIG. 3, one can see that these concatenated tokens match, and that the data from free text 505 of FIG. 5A matches records from structured data 305 of FIG. 3.

Returning to FIG. 4, policy violation responder 445 applies one or more DLP response rules (not shown) when a DLP policy violation is detected. Each DLP response rule may be associated with one or more DLP policies. Each DLP response rule includes one or more actions for policy violation responder 445 to take in response to violation of an associated DLP policy. Once a violation of a DLP policy is discovered, policy violation responder 445 may determine which DLP response rules are associated with the violated DLP policy. One or more actions included in the response rule can then be performed. Examples of performed actions include sending a notification to an administrator, preventing the data from exiting an endpoint device through a data loss vector, locking down the computer so that no data can be moved off of the endpoint device through any data loss vector, encrypting data as it is moved off the endpoint device, and so on.

Incident report generator 440 may generate an incident report noting the violated DLP policy and the circumstances surrounding the violated DLP policy. Incident report generator 440 may maintain a record of incident reports of some or all policy violations that have occurred on an endpoint device and/or that have been attempted by a particular user. The user may be identified, for example, based on a user login. In addition to identifying the DLP policy that was violated, each incident report may also indicate the circumstances of the policy violation. For example, the incident report may identify an application, user, data loss vector, type of sensitive data (e.g., Social Security number, credit card number, etc.), etc. associated with the policy violation. The incident report generator may also include a time stamp showing when the policy violation occurred.

Figure 6:
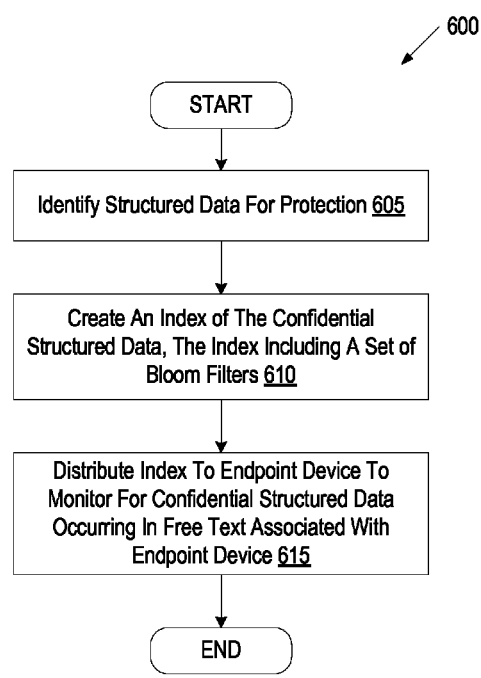
FIG. 6 is a flow diagram illustrating one embodiment for a method of generating an index from structured data.

FIG. 6 is a flow diagram illustrating one embodiment for a method 600 of generating an index for protecting structured data. The method 600 is performed by processing logic that may comprise hardware (circuitry, dedicated logic, etc.), software (such as is run on a general purpose computer system or a dedicated machine), or a combination of both. Method 600 may be performed by an index creator such as index creator 130 running on enforcement server 120 of FIG. 1.

Referring to FIG. 6, at block 605 processing logic identifies structured data (e.g., database data) for protection. At block 610, processing logic creates an index of the confidential structured data. The generated index includes a set of Bloom filters. The generated index may also include a pattern list that includes type patterns for each of the attributes in the structured data that is to be protected. At block 615, processing logic distributes the index to endpoint devices to enable the endpoint devices to monitor for confidential structured data occurring in free text associated with the endpoint device. The method then ends.

Figure 7:
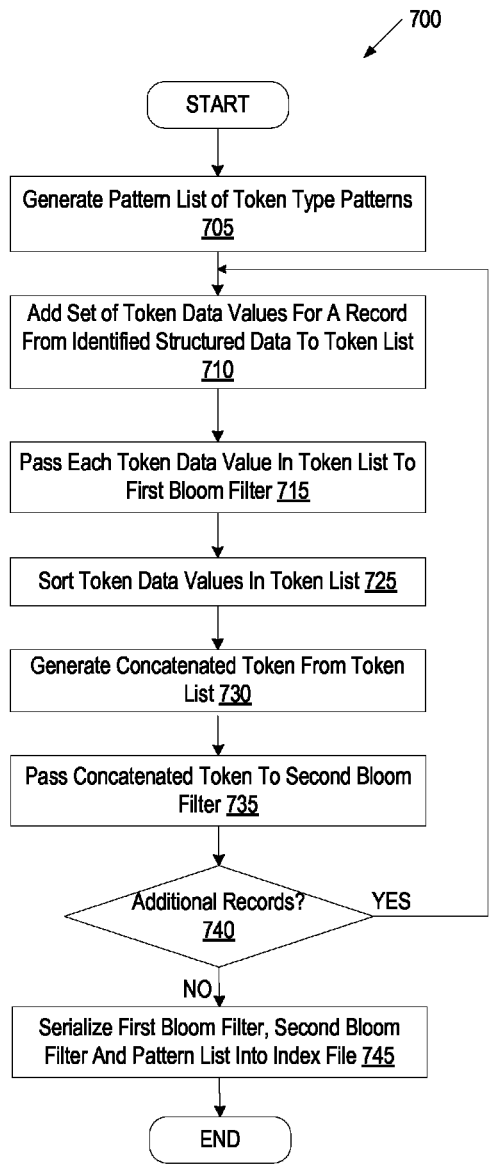
FIG. 7 is a flow diagram illustrating another embodiment for a method of generating an index from structured data.

FIG. 7 is a flow diagram illustrating another embodiment for a method 700 of generating an index for protecting structured data. The method 700 is performed by processing logic that may comprise hardware (circuitry, dedicated logic, etc.), software (such as is run on a general purpose computer system or a dedicated machine), or a combination of both. Method 700 may be performed by an index creator such as index creator 130 running on enforcement server 120 of FIG. 1. In one embodiment, method 700 is performed at block 610 of method 600.

Referring to FIG. 7, at block 705 processing generates a pattern list of token type patterns. Each token type pattern may include a pattern rule or set of rules that can be used to identify tokens that may be members of a particular attribute in structured data that is to be protected. In one embodiment, processing logic automatically determines one or more token type patterns based on an analysis of the different data values associated with a particular attribute. Alternatively, or in addition, a user may specify one or more token type patterns.

Structured data that is to be protected will likely include multiple records, where each record includes multiple different tokens. At block 710, processing logic adds a set of token data values for a record from identified structured data to a token list. At block 715, processing logic passes each token data value in the token list to a first Bloom filter. At block 725, processing logic sorts the token data values in the token list based on an ordering rule or set of ordering rules. For example, token data values may be sorted in ascending alphabetical order, descending alphabetical order, or in some other order.

At block 730, processing logic generates a concatenated token from the token list. The concatenated token may be a single token that includes the data values of each token in the token list. At block 735, processing logic passes the concatenated token to a second Bloom filter.

At block 740, processing logic determines whether there are any additional records to be processed for protection. If there are no more records from the identified structured data that need to be protected, the method continues to block 745. If any additional records are unprocessed, the method returns to block 710 and the process repeats for a next record.

At block 745, processing logic serializes the first Bloom filter, second Bloom filter and pattern list into an index. The serialized index (e.g., index file) may then be distributed to DLP systems for use in protecting the structured data.

Figure 8:
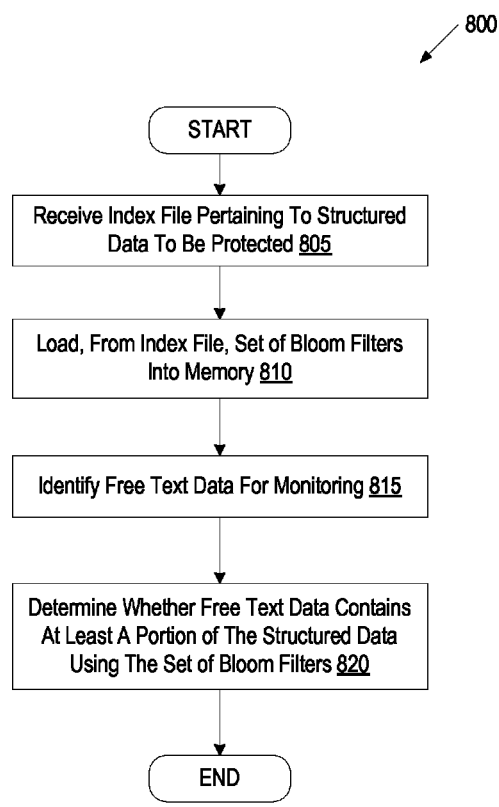
FIG. 8 is a flow diagram illustrating one embodiment for a method of using an index to identify protected structured data in free text data.

FIG. 8 is a flow diagram illustrating one embodiment for a method 800 of using an index to identify protected structured data in free text data. The method 800 is performed by processing logic that may comprise hardware (circuitry, dedicated logic, etc.), software (such as is run on a general purpose computer system or a dedicated machine), or a combination of both. Method 800 may be performed by DLP systems such as endpoint DLP system 106 running on endpoint devices 102A-102B of FIG. 1.

Referring to FIG. 8, at block 805 processing logic receives an index file pertaining to structured data to be protected. The index file may be received as a component of a data loss prevention policy, and may be accompanied by a DLP response rule or rules. At block 810, processing logic loads a set of Bloom filters into memory from the index. The set of Bloom filters may include a first Bloom filter that has been generated from tokens that represent individual attributes in structured data and a second Bloom filter that has been generated from concatenated tokens that represent multiple attributes of individual records in the structured data. The index may additionally include a pattern list, which processing logic may also load into memory.

At block 815, processing logic identifies free text data for monitoring. The free text data may be from an email message, instant message, saved file, etc. At block 820, processing logic determines whether the free text data contains at least a portion of the structured data using the set of Bloom filters. In one embodiment, processing logic also uses the pattern list to determine whether the free text data contains at least a portion of the structured data. The method then ends.

Figure 9:
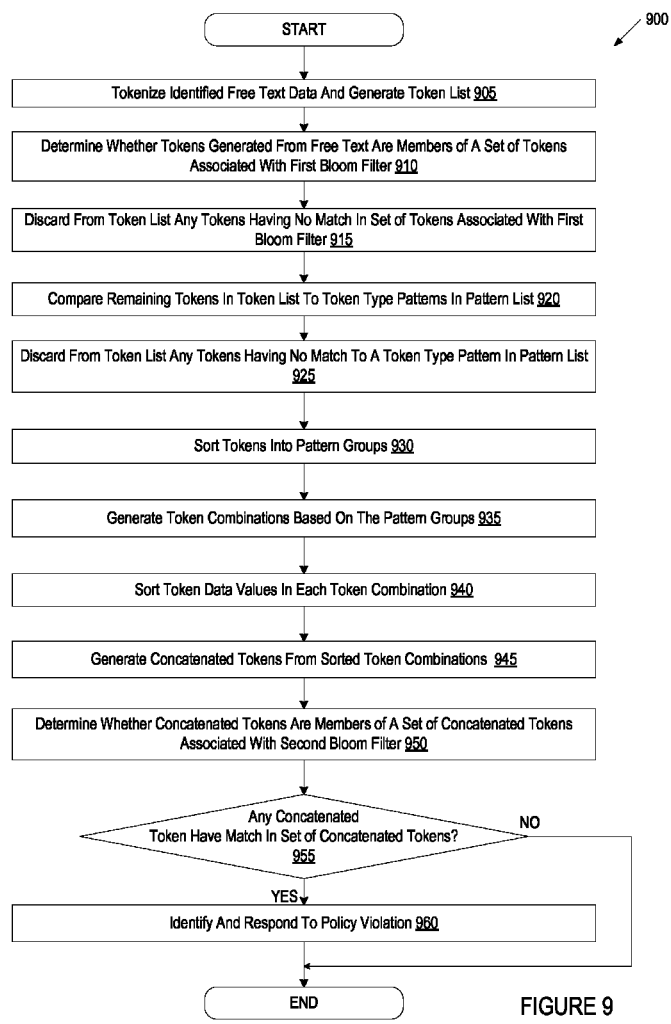
FIG. 9 is a flow diagram illustrating another embodiment for a method of using an index to identify protected structured data in free text data.

FIG. 9 is a flow diagram illustrating another embodiment for a method 900 of using an index to identify protected structured data in free text data. The method 900 is performed by processing logic that may comprise hardware (circuitry, dedicated logic, etc.), software (such as is run on a general purpose computer system or a dedicated machine), or a combination of both. Method 900 may be performed by DLP systems such as endpoint DLP system 106 running on endpoint devices 102A-102B of FIG. 1. In one embodiment, method 900 is performed at block 820 of method 800.

Referring to FIG. 9, at block 905 processing logic tokenizes identified free text data and generates a token list from the generated tokens. At block 910, processing logic determines whether the tokens generated from the free text are members of a set of tokens associated with a first Bloom filter. This may include querying the first Bloom filter with each token and receiving either a positive response (indicating that the token is a member of the set) or a negative response (indicating that the token is not a member of the set). At block 915, processing logic discards from the token list any tokens having no match in the set of tokens associated with the first Bloom filter (tokens not a member of the set).

At block 920, processing logic compares the remaining tokens in the token list to token type patterns in a pattern list. The pattern list may have been loaded into memory from an index file. At block 925, processing logic discards from the token list any tokens having no match to a token type pattern in the pattern list.

At block 930, processing logic sorts the tokens into pattern groups. Each token that matches the pattern rules of a particular type pattern in the pattern list is added to a pattern group for that type pattern. At block 935, processing logic generates token combinations based on the pattern groups. Each token combination includes a token from a first pattern group, another token from a second pattern group, and so on. Every possible combination of tokens from the different pattern groups may be generated.

At block 940, processing logic sorts the token data values in each token combination. The sorting may be performed using a same sorting rule or rules that were used during generation of the index from which the Bloom filters and pattern list were loaded. In one embodiment, the token data values are sorted alphabetically. At block 945, processing logic generates concatenated tokens from the sorted token combinations. Each concatenated token includes data values of each token included in a sorted token combination.

At block 950, processing logic determines whether the concatenated tokens are members of a set of concatenated tokens associated with a second Bloom filter. At block 955, if any concatenated tokens have a match in the set of concatenated tokens represented in the second Bloom filter, the method continues to block 960. Otherwise, the method ends.

At block 960, processing logic identifies the concatenated tokens that had a match in the set of concatenated tokens represented in the second Bloom filter as protected structured data. Processing logic determines that a DLP policy has been violated and responds to the policy violation. The response may include blocking an operation (e.g., a message send operation, a print operation, etc.), encrypting the free text data, generating a policy violation record, and/or some other action.

Figure 10:
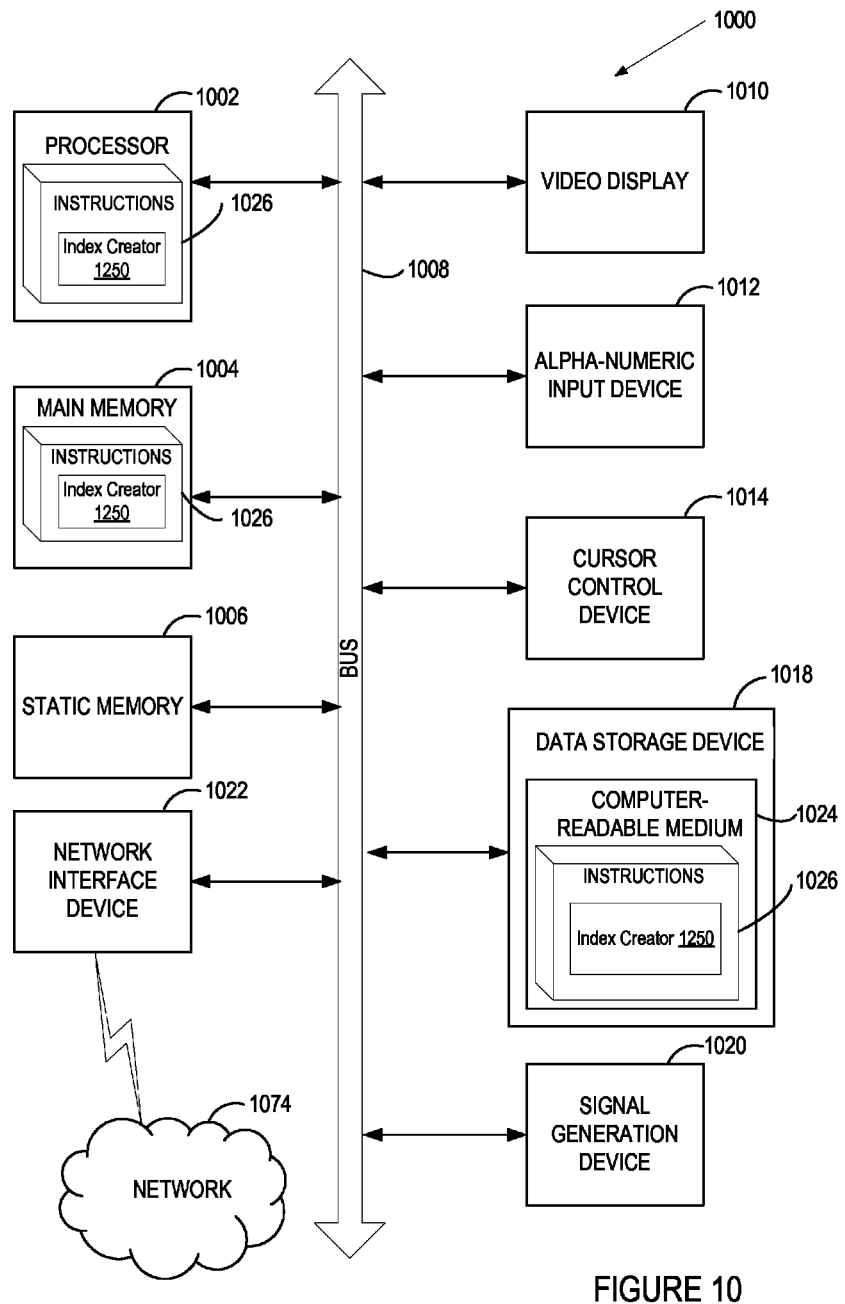
FIG. 10 is a block diagram of an exemplary computer system that may perform one or more of the operations described herein.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1008.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a computer-readable storage medium 1024 on which is stored one or more sets of instructions 1026 (e.g., software) embodying any one or more of the methodologies or functions described herein. The instructions 1026 may also reside, completely or at least partially, within the main memory 1004 and/or within the processor 1002 during execution thereof by the computer system 1000, the main memory 1004 and the processor 1002 also constituting computer-readable storage media. The instructions 1026 may further be transmitted or received over a network 1074 via the network interface device 1022.

In one embodiment, the instructions 1026 include instructions for an index creator 1250 (e.g., such as index creator 205 of FIG. 2) and/or a software library containing methods that call an index creator. Alternatively, or in addition, instructions 1026 may include instruction for a DLP system (e.g., such as DLP system 405 of FIG. 4) and/or a software library containing methods that call a DLP system. While the computer-readable storage medium 1024 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method, comprising:
identifying structured data for protection;
creating, by a server computer system, an index of the structured data, the index comprising a set of Bloom filters and a list of token type patterns, wherein the set of Bloom filters comprises a plurality of Bloom filters;
generating a data loss prevention (DLP) policy comprising the index and a DLP response rule; and
distributing the DLP policy comprising the index and the DLP response rule to an endpoint device, wherein the set of Bloom filters and the list of token type patterns in the index are to be used together for detection of structured data in free text data associated with the endpoint device, and the DLP response rule is to trigger an action to protect the structured data responsive to the detection of the structured data in the free text data.

2. The method of claim 1, wherein creating the index further comprises:
adding a set of token data values to a token list, each token data value in the set representing an individual attribute in the structured data; and
passing each token data value in the token list to a first Bloom filter in the set.

3. The method of claim 2, further comprising:
sorting the token data values in the token list using one or more specified sorting rules;
appending a plurality of the token data values in the token list to form a concatenated token; and
passing the concatenated token to a second Bloom filter in the set.

4. The method of claim 1, further comprising:
generating the list of token type patterns.

5. The method of claim 4, wherein generating the list of token type patterns comprises:
generating a Social Security number token type pattern; and
generating a credit card number token type pattern.

6. The method of claim 4, further comprising:
serializing the first Bloom filter, the second Bloom filter and the list of token type patterns into an index file.

7. The method of claim 6, further comprising:
periodically distributing an updated index file over a secure network.

8. An endpoint device, comprising:
a memory; and
a processing device coupled with the memory to:
receive a data loss prevention (DLP) policy comprising an index file pertaining to structured data to be protected and a DLP response rule;
load, from the index file, a set of Bloom filters into memory, wherein the set of Bloom filters comprises a plurality of Bloom filters;
load, from the index file, a list of token type patterns into memory;
identify free text data for monitoring;
determine whether the free text data contains at least a portion of the structured data using the set of Bloom filters and the list of token type patterns; and
perform an action designated by the DLP response rule responsive to detection of the structured data in the free text data.

9. The endpoint device of claim 8, wherein the processing device is further to:
identify a set of discrete free text tokens for insertion into a discrete free text token list;
compare the list of discrete free text tokens with a set of tokens associated with the first Bloom filter;
discard, from the list of discrete free text tokens, a subset of free text tokens having no match in the set of tokens associated with the first Bloom filter; and
maintain a surviving list of tokens remaining after discarding the subset of free text tokens having no match in the set of tokens associated with the first Bloom filter.

10. The endpoint device of claim 9, wherein the processing device is further to:
compare free text tokens in the surviving list with the list of token type patterns;
discard, from the surviving list, a subset of free text tokens having no match with the list of token type patterns; and
maintain a second surviving list of tokens remaining after discarding the subset of free text tokens having no match with the list of token type patterns.

11. The endpoint device of claim 10, wherein the processing device is further to:

sort tokens in the second surviving list by token type pattern; and append the sorted tokens in the second surviving list to create a concatenated token.

12. The endpoint device of claim 11, wherein the processing device is further to:

compare the concatenated token with a list of tokens associated with the second Bloom filter; and declare structured data found in the concatenated token based at least in part on the comparison of the concatenated token with the list of tokens associated with the second Bloom filter.

13. The endpoint device of claim 12, wherein the action comprises notifying a server of found structured data and an identity of the endpoint device.

14. The endpoint device of claim 12, wherein the action comprises preventing the endpoint device from communicating found structured data over the network.

15. A non-transitory computer readable storage medium including instructions that, when executed by a processor, cause the processor to:

identify structured data for protection;

create, by the processor, an index of the structured data, the index comprising a set of Bloom filters and a list of token type patterns, wherein the set of Bloom filters comprises a plurality of Bloom filters;

generate a data loss prevention (DLP) policy comprising the index and a DLP response rule; and distribute the DLP policy comprising the index and the DLP response rule to an endpoint device, wherein the set of Bloom filters and the list of token type patterns in the index are to be used together for detection of structured data in free text data associated with the endpoint device, and the DLP response rule is to trigger an action to protect the structured data responsive to the detection of the structured data in the free text data.

16. The non-transitory computer readable storage medium of claim 15, further including instructions that, when executed by the processor, cause the processor to:

query a structured data source for a set of token values to be protected;

add the set of token values to a token list, each token value in the set representing one of the individual attributes in the structured data;

sort the set of token values in the list based on one or more sorting rules; and pass the sorted token values to the first Bloom filter.

17. The non-transitory computer readable storage medium of claim 16, further including instructions that, when executed by the processor, cause the processor to:

append one or more token values in the sorted list to form a concatenated token; and pass the concatenated token to the second Bloom filter.

18. The non-transitory computer readable storage medium of claim 17, further including instructions that, when executed by the processor, cause the processor to:

generate the list of token type patterns.

19. The non-transitory computer readable storage medium of claim 18, further including instructions that, when executed by the processor, cause the processor to:

serialize the first Bloom filter, the second Bloom filter and the list of token type patterns into an index file.

20. The non-transitory computer readable storage medium of claim 19, further including instructions that, when executed by the processor, cause the processor to:

periodically distribute an updated serialized file over a secure network.

* * * * *